United States Patent [19]

Ruger et al.

[11] Patent Number: 5,122,270
[45] Date of Patent: Jun. 16, 1992

[54] FILTER CARTRIDGE OR FILTER MODULE CONSISTING OF FLEXIBLE DEEP FILTER MATERIAL

[75] Inventors: Helmut Ruger, Pfaffen-Schwabenheim; Massoud Karbachsch, Gottingen, both of Fed. Rep. of Germany

[73] Assignee: Seitz-Filter-Werke Theo & Geo Seitz GmbH & Co., Bad Kreuznach, Fed. Rep. of Germany

[21] Appl. No.: 506,911

[22] Filed: Apr. 9, 1990

[30] Foreign Application Priority Data

Apr. 11, 1989 [DE] Fed. Rep. of Germany ........ 3911826

[51] Int. Cl.⁵ .............................................. B01D 27/06
[52] U.S. Cl. ................................... 210/282; 210/493.2; 210/493.4; 210/497.1; 55/487; 55/498; 55/520
[58] Field of Search .................... 55/487, 498, 520; 210/493.4, 494.1, 497.1, 492.2, 263, 282, 502.1

[56] References Cited

U.S. PATENT DOCUMENTS

| 2,742,160 | 4/1956 | Fogwell | 210/169 |
|---|---|---|---|
| 3,450,632 | 6/1969 | Olson et al. | |
| 3,521,429 | 7/1970 | Leffler | 55/520 |
| 4,112,159 | 9/1978 | Pall | 428/36 |
| 4,233,042 | 11/1980 | Tao | 55/482 |
| 4,239,627 | 12/1980 | Wada | 210/484 |
| 4,600,562 | 7/1986 | Virk et al. | 55/487 |
| 4,714,647 | 12/1987 | Shipp, Jr. et al. | 55/487 |
| 4,759,782 | 7/1988 | Miller et al. | 55/487 |
| 4,863,602 | 9/1989 | Johnson | 210/494.1 |
| 4,983,193 | 1/1991 | Tari et al. | 55/487 |

FOREIGN PATENT DOCUMENTS

| 0053879 | 6/1982 | European Pat. Off. |
| 3740249 | 11/1988 | Fed. Rep. of Germany |
| 600208 | 4/1948 | United Kingdom |
| 1199005 | 7/1970 | United Kingdom |
| 1271867 | 4/1972 | United Kingdom |
| 1395399 | 5/1975 | United Kingdom |
| 1554070 | 10/1979 | United Kingdom |
| 2152471 | 8/1985 | United Kingdom |

*Primary Examiner*—W. Gary Jones
*Assistant Examiner*—Wanda L. Millard
*Attorney, Agent, or Firm*—H. Gibner Lehmann; K. Gibner Lehmann

[57] ABSTRACT

A filter cartridge with a filter element inserted in a receiving space formed by a central cylindrical flow pipe 32 and a peripheral wall 34 is in terms of its possibilities of use and possibilities of adaptation to filtration problems substantially improved in that the filter element consists of fleece-like filter material and in that in its radial direction it comprises mutually enclosing zones of different filtering properties. For practical purposes, these zones can follow one another without any transition or they may be constructed with filtering properties which are varied in stepwise fashion. The filter element can be formed by the combination of a pleated filter fleece with a rolled-up filter fleece, the pleated part of the filter element being optionally on the inside or the outside. A rolled-up filter element or the rolled-up part of a filter element may be produced from a strip of fleece-like filter material, the said strip possibly having filtering properties which over its length are varied continuously or from portion to portion.

6 Claims, 3 Drawing Sheets

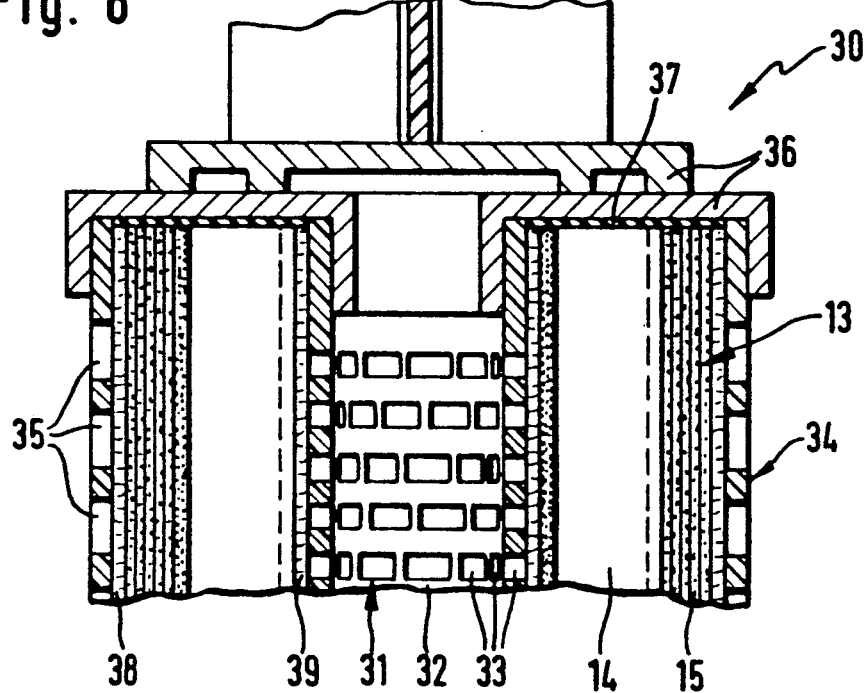
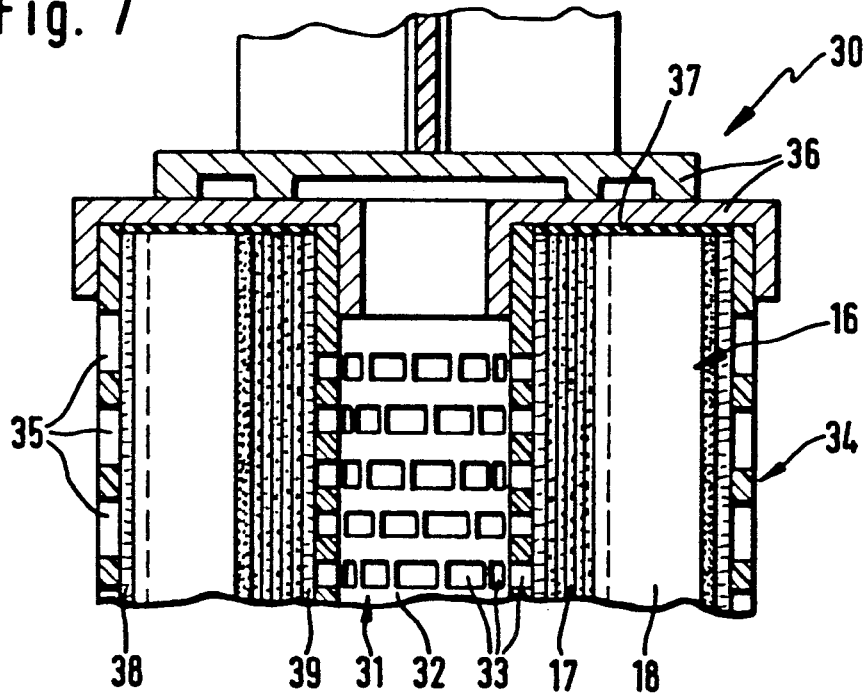

FILTER CARTRIDGE OR FILTER MODULE CONSISTING OF FLEXIBLE DEEP FILTER MATERIAL

BACKGROUND OF THE INVENTION

The invention relates to a filter cartridge comprising, in its annular receiving space formed between a central flow passage and its peripheral wall in which there are through-flow apertures, a filter element traversed substantially radially in respect of the receiving space by the medium which is to be filtered, the filter element being supported in a leak-proof sealed fashion between end caps which support its two ends.

DESCRIPTION OF THE RELATED ART INCLUDING INFORMATION DISCLOSED UNDER 37 CFR §§1.97–

In practiced, winding modules are known in which a uniform deep filter fleece or threads are wound spirally around a draining central tube. Winding modules of this type have the disadvantage that when filtering very clouded substances they become blocked very quickly. The cause of the rapid clogging of this type of rolled cartridge is the fact that they exhibit an homogeneous construction, i.e. an even retention characteristic, over their entire depth. Due to the spiral winding process, only the outer layer which is accessible to the fluid becomes involved and clogged. The layers underneath remain unaffected.

Winding modules are also known which instead of strip-like filter fleeces have threads of differing thickness which are wound on bobbin-like and which may for example be connected to one another by heat (U.S. Pat. No. 4,112,159). The disadvantage of these winding modules lies in the fact that they are built up from pure spun polyolefin threads (e.g. polypropylene) and consequently do not have the good particle retention for which the strip-like filter layers are well known, so that they are not suitable for filtering heavily colloidal turbidity-laden substances.

Furthermore, winding modules are known which, with a flat filter strip with a draining supporting and spacing holder are welded or glued or rolled onto one another in a coincident relationship to form closed strips (DE-PS 37 40 249). The disadvantage of winding modules of this type is that the different filter or draining strips and spacers are placed on one another in separate operations and have to be welded or glued to one another to form endless strips. Modules of this type are severely labour-intensive and render automatic and rational production difficult. Apart from the fact that the filter strips or drainage fabrics, as well as the spacers, cannot be welded in a leak-proof fashion, there is the risk of a short circuit between filtrate and unfiltered material. Furthermore, the provision of the woven drainage material means that a high percentage of filter-active depth is lost.

SUMMARY OF THE INVENTION

In contrast, it is the object of the invention to form a filter cartridge of which the filter element exhibits "broad band deep filtering properties", in other words different deep filter properties which cannot be combined into one single filter material.

According to the invention, this problem is resolved in that the filter element which occupies the annular receiving space consists of fleece-like filter material and has in its radial direction mutually surrounding zone having different filtering properties.

The filter cartridges according to the invention are characterized by retention characteristics which differ in a radial direction. The variation in filtering properties which is provided in the radial direction, in other words in the direction of flow through the filter element, makes it possible to combine in one filter element those filtering properties which basically call for different possibly mutually excluding structure and composition of filter material. For example, this makes it possible to undertake in a radial direction depthwise fractionated filtration and/or matter conversion. The transitionless or stepwisely radially consecutive zones of the filter element afford all manner of possibilities of variation in respect of the properties of the individual filter zones. In consequence, the filter cartridges according to the invention offer substantially enhanced possibilities of use or improved possibilities of adaptation to the particular filtration task in hand. The filter cartridges according to the invention can thereby be produced by simple means and in a rational and simple procedure.

In one embodiment of the invention, the filter element comprises zones which follow on from one another with no transition so that for practical purposes their filtering properties are varied continuously in a radial direction. This embodiment of filter cartridge according to the invention is particularly suitable for those filtering tasks which indeed may only require a relatively small breadth of variation of filtering properties but which call for close tolerance transitions.

In another embodiment of the invention, the basic premise is a tubular filter element with mutually enclosing tubular zones in radial sequence. With this embodiment of the invention, tubular zones are provided in the filter element as zones with stepwisely mutually varied filtering properties. With this embodiment of the invention, for practical purposes a plurality of filter elements of different filtering properties are disposed one behind another in the direction of through-flow and are combined in the filter cartridge according to the invention. In consequence, it is possible for combined filtering properties with a relatively wide range of variation to be joined together and combined into one desired functional interactive unit.

In both the possible embodiments mentioned, the filtering properties which are varied in the radial direction of the filter element may be the separation character for turbidity. To this end, possibly the filter element could vary in respect of its pore size in a radial direction. For example for a filter cartridge according to the invention and through which medium to be filtered flows from the outer periphery inwards, it is possible to envisage the filter element having a pore size which diminishes from the outside inwardly in a radial direction. On the other hand, for applications it may also be advisable to consider the medium which is to be filtered flowing through the filter element from the direction of the central flow passage in which case the filter element may preferably have a pore size which diminishes in a radial direction but from the inside outwardly in order to achieve an enlargement of the area of fine-pore parts of the filter element.

Another possibility of varying the filtering properties resides in the filter element having an adsorption characteristic (cationic and/or anionic) which is varied in a radial direction.

In the case of filter cartridges with a wound or coiled filter element, the embodiment according to the invention can be easily invested with filtering properties which vary in a radial direction in that the filter element is rolled up, strip-like filter medium fleece which has filtering properties which are varied over its length. In this respect, the filter medium fleece may have filtering properties which are varied continuously over its length. A filter element which is rolled up from such a filter medium fleece with filtering properties which are varied continuously over its length has itself filtering properties which are virtually continuously varied in a radial direction.

The filter medium fleece used for rolling the filter element can however be constructed in portions in a longitudinal direction, the portions having different filtering properties. A filter element which is rolled up from such a filter medium fleece has radially superimposed zones of differing filtering properties, the filtering properties varying more or less abruptly from one zone to the next. Such filter elements can be produced particularly easily.

This embodiment of the invention also has the advantage that the radially superimposed zones of the filter element can easily be constructed with different radial thicknesses. This can easily be arranged by the choice of the length of the individual portions on the filter medium fleece from which the filter element is rolled. The portions of different filtering properties of the filter medium fleece can be produced separately from one another and combined to form the filter fleece by being arranged in rows and welded or glued together. It is however also entirely conceivable to provide a filter fleece which should be used for rolling up the filter element and in which the portions of different filtering properties are connected to one another in one piece and merge into one another in a seamless fashion. Such strip-like filter fleeces can for example be produced in that a broad strip of filter fleece is continuously produced with filtering properties which are varied over its width, the strip then being cut in a transverse direction into strips, each of which then forms a filter fleece which can be rolled up to produce a filter element.

Another embodiment of the filter cartridge according to the invention can also provide for different ways of disposing the filter fleeces which form the filter element. For example, the filter element may comprise at least two radially consecutive tubular filter element zones in at least one of which there is a pleated filter fleece while in at least one other tubular zone of the filter element there is a rolled-up filter fleece. The pleated filter fleece affords a very large surface area to which the medium to be filtered is applied but a relatively small filtering depth in the direction of throughflow. On the other hand, the rolled-up filter element offers a substantially smaller surface area which can become involved but a very much greater filter depth than the pleated filter fleece. Certainly, however, despite these considerable differences in disposition, it is nevertheless possible to arrive at a sensible combination of pleated filter fleece and rolled-up filter fleece within the filter element of a filter cartridge. At the same time, it is preferable for the filter element to have in two radially consecutive zones a radially inner filter element body of pleated filter fleece and a radially outer filter element body which is constituted from at least one layer of filter fleece which is wound completely around the inner filter element body which consists of pleated filter element fleece. With the combination of different methods of disposing the filter fleece, the filter fleeces of the various radially consecutive zones—apart from the differences dictated by their different disposition—may also have different filtering properties which are brought about by differences in the fleece structure and/or in the choice of filter materials.

In one particularly favourable embodiment, the filter fleeces to be used for rolling up the filter elements may consist of synthetic plastics and/or natural fibers with a filter medium which traps particles and/or turbidity and they may have a thickness of between 0.5 mm and 5 mm.

In order to provide the inner peripheral surface and/or the outer peripheral surface of the filter element which consists of filter fleece with a layer which distributes and protects the filtrate and/or unfiltered substance, it is possible for a draining woven synthetic plastics fabric or fleece to be wrapped around a cylindrical flow tube and/or around the filter element to brace the filter element in respect of the central guide passage.

BRIEF DESCRIPTION OF THE DRAWINGS

Examples of embodiment of the invention are explained in greater detail hereinafter with reference to the accompanying drawings, in which:

FIG. 6 shows a diagrammatic partial longitudinal section through a filter cartridge according to the invention with a pleated zone (inside) and a rolled zone (outside) in the form of radially disposed and different filtration zones and FIG. 7 is a diagrammatic partial longitudinal section through a filter cartridge according to the invention with a pleated zone (outside) and a rolled zone (inside) in the form of radially disposed and different filtration zones.

DESCRIPTION OF THE PREFERRED EMBODIMENTS

Figure 1:
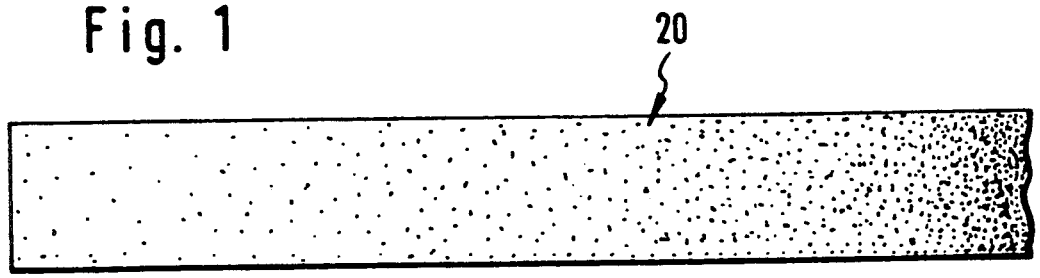
FIG. 1 is a partial plan view of a strip of fleece-like deep filter material which is to be used for rolling up a filter element and which has filtering properties which differ continuously in a longitudinal direction.
Figure 2:
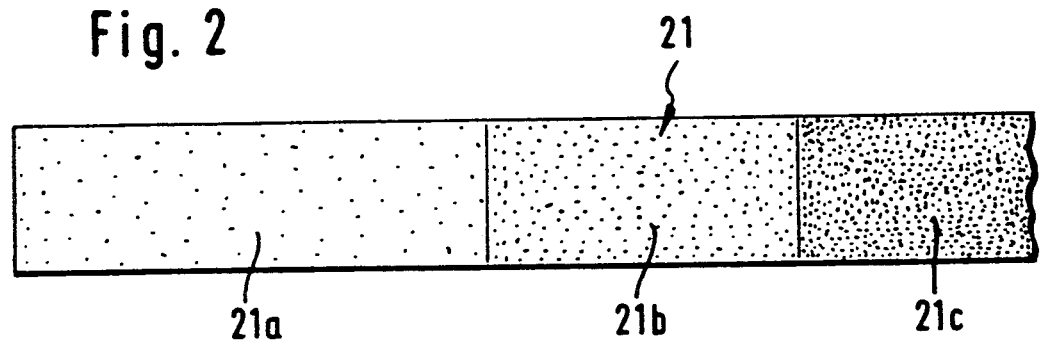
FIG. 2 is a partial plan view of a strip of fleece-like deep filter material which is to be used for rolling up a filter element and which has different filtration zones which are of different lengths.

FIG. 1 shows a filter fleece 20 prepared for the production of an at least partially wound filter element and which has filtering properties which vary continuously from one end (on the left in the drawing) to the other end (on the right in the drawing), as is illustrated by the differing arrangement of dots. In the example shown in FIG. 2, this is a prepared filter fleece 21 which has at one end (on the left in the drawing) a portion 21a of for example high porosity, as indicated by the lesser density of dots. In the middle portion 21b, the filter fleece 21 has a more intense compression, in other words a reduced porosity, while in the right hand zone 21c there is once again a more pronounced compaction, in other words a further reduced porosity. The portions 21a, 21b and 21c can—as indicated in FIG. 2—be of different lengths, for example so that the length of the portions 21a, 21b, 21c increase in length from the end which is rolled up into the interior of the filter element to be produced to the end which is finally on the outside of the filter element. The arrangement can in fact be such that the radially superimposed zones formed by the portions 21a, 21b, 21c have substantially the same radial thickness. It is however also possible for the zones formed by rolling up a fleece-like strip 21 to be constructed with different radial thicknesses according to the particular application of the filter element or in order to adapt to the filtration problem which is to be resolved.

Figure 3:
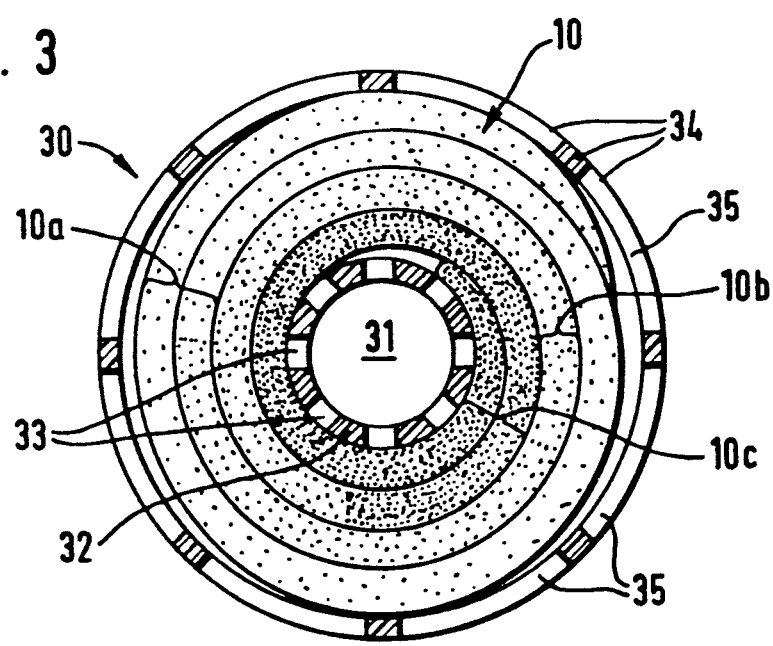
FIG. 3 is a diagrammatic cross-section through a filter element which is rolled from a strip of filter material according to FIG. 2.

FIG. 3 diagrammatically shows in cross-section a filter element 10 which is rolled up from a fleece-like filter strip according to FIG. 2. FIG. 2 shows the formation of mutually enclosing radially consecutive zones 10a, 10b, 10c of different filtration properties. Between the consecutive zones 10a, 10b, 10c there is in each case a stepped grading of the filtering properties. In contrast to this, a filter element rolled up from a special filter material as shown in FIG. 1 would have filtering properties which would vary from one layer to the next so negligibly that one could virtually regard the variation in filtering properties in the radial direction as being continuous, in other words equivalent to a transitionless succession of the radial zones in the rolled up filter element.

Figure 4:
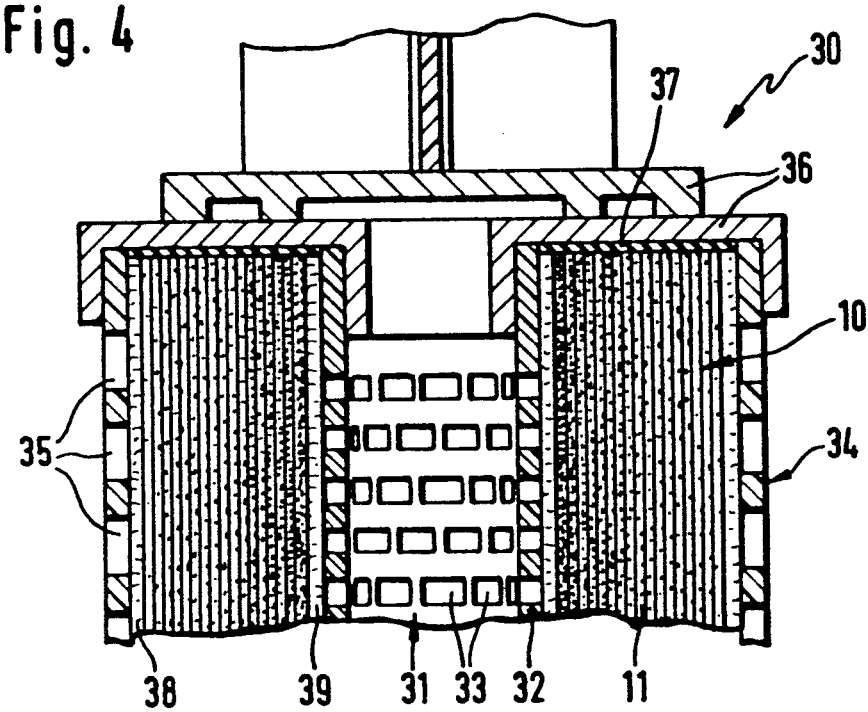
FIG. 4 is a diagrammatic partial longitudinal section through a filter cartridge according to the invention with radially disposed virtually transitionless different filtration zones in a per se known supporting structure.
Figure 5:
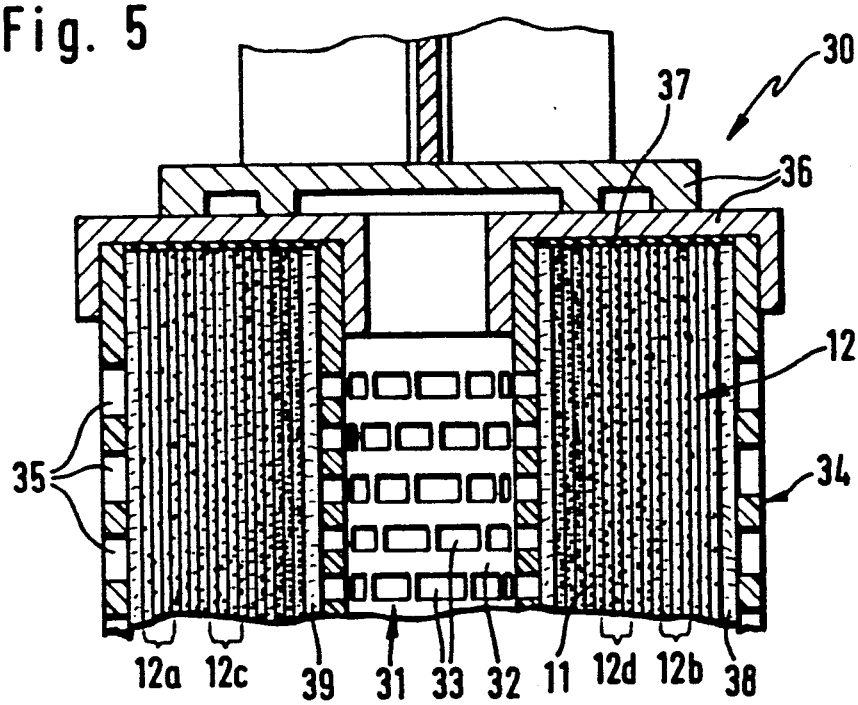
FIG. 5 shows a diagrammatic partial longitudinal section through a filter cartridge according to the invention with radially stepwisely disposed different filtration zones in a per se known supporting framework.

The essentially continuous variation in filtering properties in the radial direction is illustrated in FIG. 4. The superimposed rolled-up layers 11 of filter element 10 differ so little in their filtration properties that where the filtering properties are concerned, there can be no mention of any notable transition from layer 11 to layer. The rolled-up layers therefore form zones in the filter element and there is no transition between them. In contrast, in the case of a filter element 12 which is rolled up from a strip of filter material 21 according to FIG. 2, FIG. 5 shows the construction of a plurality of zones 12a, 12b, 12c..., the filtering properties of which vary in a clearly stepped manner, the type and number of these mutually surrounding and mutually radially disposed zones requiring to be chosen in accordance with the intended use of the filter cartridge, i.e. the problem which it has to resolve.

The above-described filter fleece which has to be used for producing filter elements is also suitable for pleating. For example, at least partially pleated filter elements can be produced from such a filter fleece. FIG. 6 shows an example of embodiment in which the filter element 13 has in its inner part a zone 14 which consists of pleated filter fleece while an outer zone 15 of the filter element 13 consists of a filter fleece which is rolled up over the pleated filter fleece of the zone 14. FIG. 7 shows one way in which the filter element 16 can have its inner zone 17 formed by a rolled-up filter fleece while its outer zone 18 constitutes a pleated filter fleece which is fitted around the rolled-up filter fleece of the zone 17.

In the examples shown in FIGS. 4 to 7, a filter cartridge 30 comprises a cylindrical flow pipe 32 which fulfils a bracing function in respect of the central flow passage 31 and which comprises through-flow apertures 33. Provided on the outer periphery of the filter cartridge 30 is a peripheral wall 34 which is provided with through-flow apertures 35. At the two ends, the interior space which accommodates the filter element and which is formed between the flow pipe 32 and the peripheral wall 34 is covered by end caps 36. As shown at 37, in each of the examples of embodiment, the filter element is sealed in leak-proof manner on the inside of the end caps 36. To protect the filter element and for better distribution of the unfiltered material, the filter element is on its outer periphery wrapped in a layer 38 of draining woven synthetic plastics material or fleece. Similarly, in the examples illustrated, for better collection of the filtrate, the cylindrical flow pipe 32 has wrapped around it a layer 39 of draining woven synthetic plastics fabric or fleece.

What is claimed is:

1. A filter cartridge for filtering a fluid medium, comprising in combination an annular wall structure (34) having flow-through apertures and having a central flow passage surrounded by said wall structure, an end cap (36) connected to said wall structure, and a substantially annular filter element (10, 13) disposed within said annular wall structure (34), said fluid medium being adapted to flow radially through said annular filter element and said end cap sealingly engaging the end of said filter element against leakage, said filter element (10, 13) comprising layers of a strip of filter medium fleece (20) wound into a spiral shape, said strip having an essentially continuous density gradient absent of transition along its length whereby the filter element in radial directions has different filtering properties in mutually surrounding zones, said filter element (10, 13) being characterized by a cationic adsorption characteristic which varies in a radial direction.

2. A filter cartridge for filtering a fluid medium, comprising in combination an annular wall structure (34) having flow-through apertures and having a central flow passage surrounded by said wall structure, an end cap (36) connected to said wall structure, and a substantially annular filter element (10, 13) disposed within said annular wall structure (34), said fluid medium being adapted to flow radially through said annular filter element and said end cap sealingly engaging the end of said filter element against leakage, said filter element (10, 13) comprising layers of a strip of filter medium fleece (20) wound into a spiral shape, said strip having an essentially continuous density gradient absent of transition along its length whereby the filter element in radial directions has different filtering properties in mutually surrounding zones, said filter element (10, 13) being characterized by a cationic adsorption characteristic which varies in a radial direction.

3. A filter cartridge for filtering a fluid medium, comprising in combination an annular wall structure (34) having flow-through apertures and having a central flow passage surrounded by said wall structure, an end cap (36) connected to said wall structure, and a substantially annular filter element (10, 13) disposed within said annular wall structure (34), said fluid medium being adapted to flow radially through said annular filter element and said end cap sealingly engaging the end of said filter element against leakage, said filter element (10, 13) comprising layers of a strip of filter medium fleece (20) wound into a spiral shape, said strip having an essentially continuous density gradient absent of transition along its length whereby the filter element in radial directions has different filtering properties in mutually surrounding zones, said mutually-surrounding zones comprising one zone (14) having a pleated filter fleece, and another zone (15) having a wound filter fleece.

4. A filter cartridge for filtering a fluid medium, comprising in combination an annular wall structure (34) having flow-through apertures and having a central flow passage surrounded by said wall structure, an end cap (36) connected to said wall structure, and a substantially annular filter element (10, 13) disposed within said annular wall structure (34), said fluid medium being adapted to flow radially through said annular filter element and said end cap sealingly engaging the end of said filter element against leakage, said filter element (10, 13) comprising layers of a strip of filter medium fleece (20) wound into a spiral shape, said strip having an essentially continuous density gradient absent of transition along its length whereby the filter element in radial directions has different filtering properties in mutually surrounding zones, said mutually-surrounding zones comprising two radially consecutive zones, one radially-inner zone (14) comprising pleated filter fleece, and the other radially outer zone (15) being formed from an encircling layer of filter fleece wound around the radially inner zone (14).

5. The invention as set forth in claim 4, wherein the said two radially consecutive zones have differing filtering properties as a consequence of differences in the structure of the filter medium fleece.

6. The invention as set forth in claim 4, wherein the said two radially consecutive zones have differing filtering properties as a consequence of differences in the material of the filter medium fleece.

* * * * *